1,923,546

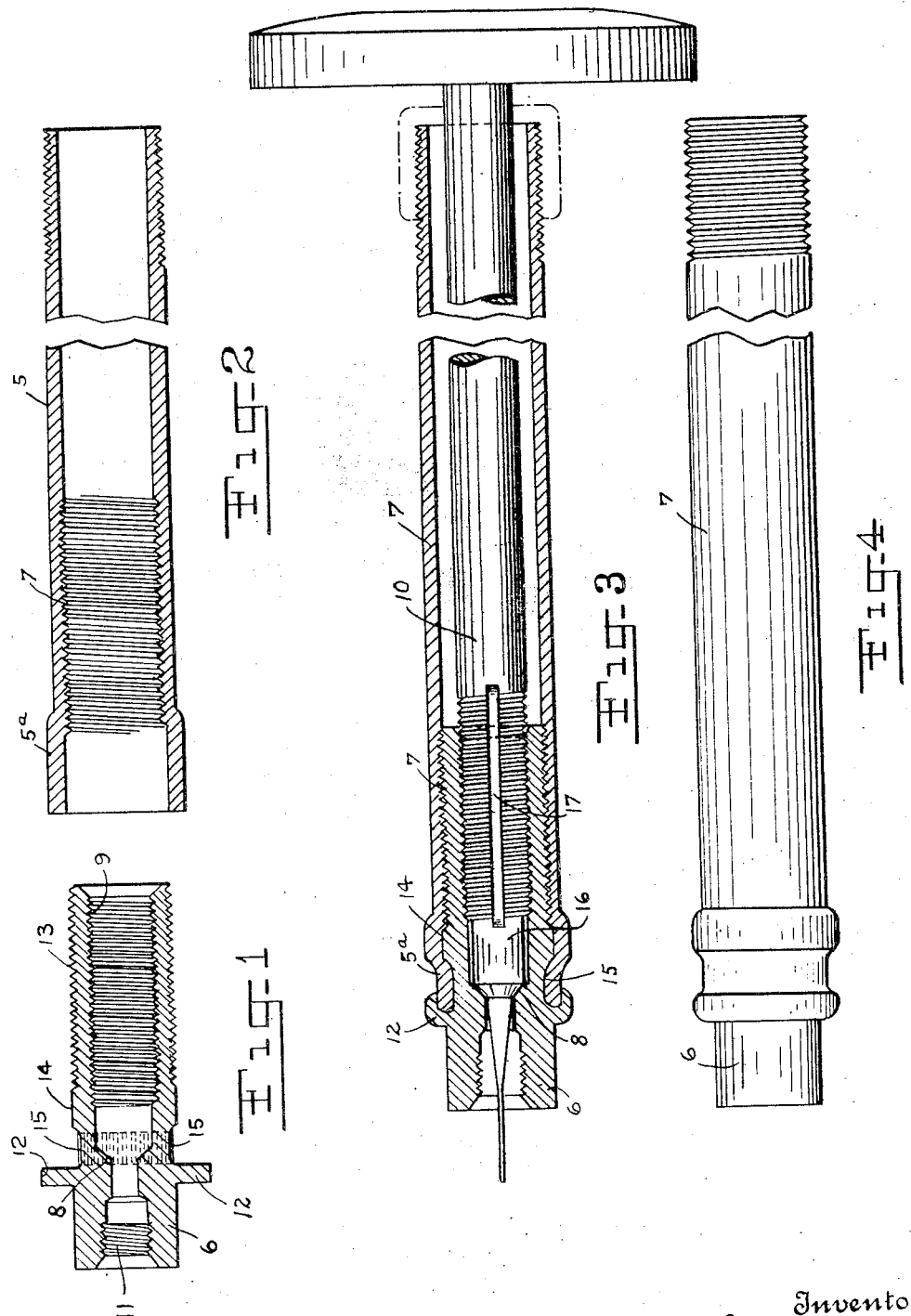
Aug. 22, 1933.  W. C. LINDEMANN ET AL  1,923,546
FUEL VAPORIZER AND METHOD OF MAKING SAME
Filed Nov. 15, 1929
Inventors
Walter C. Lindemann
Adolph T. Schmidt
By their Attorney Patented Aug. 22, 1933

UNITED STATES PATENT OFFICE 1,923,546

FUEL VAPORIZER AND METHOD OF MAKING SAME

Walter C. Lindemann and Adolph T. Schmidt, Milwaukee, Wis., assignors to A. J. Lindemann & Hoverson Company, Milwaukee, Wis., a Corporation of Wisconsin Application November 15, 1929
Serial No. 407,416

9 Claims. (Cl. 285—56)

The present improvements relate, in general to vaporizers for hydrocarbon stoves and the like, and more particularly to a novel leak-proof joint between the vaporizing tube and the usual valve seat plug associated therewith, as well as to the method of forming such joints. Although the improvements have been described and illustrated in connection with a vaporizer, it is understood that they are of general application and may be employed for uniting tubular members of greater dimensions, such as gas mains, water mains and other fluid conduits.

The employment of vaporizing tubes in conjunction with hydrocarbon burners has been long known in the art and the necessity for utilizing a separate valve seat plug or bushing at the vapor discharge end of the tube rather than providing a reduced bore and seat in the tube itself, is well recognized. Difficulties encountered in the manufacture of a satisfactory one-piece vaporizer have accordingly led to the general adoption of the two-part structure. However, such a structure requires the careful formation of a joint between the parts so as to prevent leaks and at the same time to insure proper alignment of the bores.

It is, therefore, a primary object of the present improvements to provide a novel joint between two tubular members, such as a vaporizing tube and valve seat plug, and to provide a novel method of making said joint. Another object is to provide a novel mechanical leak-proof joint between cylindrical members.

A further object of the improvements is to provide a vaporizer wherein the tube and plug are mechanically united by a swaged or peened joint. To produce an efficient and economical joint which is easy and simple to manufacture, and which dispenses with welding and other methods with their attendant disadvantages, constitutes another object of the improvements.

The attainment of longer life for such joints and the provision of stronger and more efficient joints which will withstand operating stresses and strains constitutes a further object of the improvements.

Other objects and advantages of the present improvements will be apparent to those skilled in the art, upon reference to the accompanying specification and drawing in which Figure 1 is a section of a valve-seat plug or bushing.

Figure 2 is a section of a vaporizing tube.

Figure 3 is a section of a finished vaporizer illustrating the swaged or peened joint uniting the elements shown in Figures 1 and 2.

Figure 4 is a side elevation of the finished vaporizer.

In the embodiment of the invention, chosen for illustration, the vaporizer employed in connection with a hydrocarbon burner comprises the elongated vaporizing tube 5 and the tubular or hollow valve-seat plug or bushing 6. As illustrated in Fig. 2, the tube 5 is swaged out at the joint end to provide the enlarged end portion 5a and to slightly enlarge the diameter of the tube at this point so that the inner diameter of the portion 5a is substantially the same as the outer diameter of the threaded portion 7 of the tube. It is notable that the swaged portion 5a is not threaded and that the threaded portion 7 extends from portion 5a into the tube 5 sufficient to give an excess of thread strength.

Referring to the plug or bushing 6 illustrated in Fig. 1, the plug is bored to several diameters for providing the conical valve seat 8. Screw threads 9 are provided within the plug for receiving the screw threaded valve stem 10, see Fig. 3. The outer end of the plug is internally threaded at 11 for receiving a nozzle or spud (not shown). The exterior of the plug 6 is provided with an annular flange 12, a threaded portion 13 and a non-threaded portion 14. A shallow annular groove 15 is provided between portion 14 and the flange 12, the bottom of the groove being knurled with parallel knurls extending lengthwise of the plug as seen in Fig. 1.

The assembly of the parts is accomplished by screwing the plug 6 into tube 5 until the end of the tube bears tightly against the flange 12 of the plug so that portion 14 and the groove 15 are disposed within the end portion 5a of the tube. That portion 5a of the tube which surrounds the groove is now swaged or peened tightly into the groove. In this operation, the knurled portion of the groove bites into the swaged portion of the tube so that relative rotation between these parts is prevented. During this swaging or rolling operation, the end of the tube is also squeezed more tightly against the flange 12, into which it bites a slight amount. Thus far, the tube and plug have been brought into intimate contact at two areas or zones, viz: at the groove 15 and at the base of flange 12 where the tube end presses into it.

Subsequent to the foregoing operation, the flange 12 of the plug is swaged or peened tightly over the end of the tube which has been rolled into groove 15. By this operation the tube and plug have been brought into intimate contact at a third area or zone.

The finished article with the swaged or peened joint is shown in section in Fig. 3 with the valve stem 10 screwed into the plug and the valve 16 closed upon seat 8. The operation of the valve structure is well understood. Liquid fuel is admitted to the tube through a pipe (not shown) adjacent the right hand end thereof, is vaporized in the tube by the heat of a burner (not shown) and said vapor passes, when valve 16 is open, out through the channel 17 to and through plug 6 to the point of use. As the vapor obtains under considerable pressure in the tube and for numerous reasons it is essential that a leak-proof joint be provided.

Referring again to the construction and assembly of the parts, the three contact areas or zones previously mentioned prevent vapor from passing laterally along the joint. These areas accordingly provide a succession of positive seals. While these three zones or areas have been pointed out by way of emphasis, it is understood that the sealing effect is not limited to these areas, but obtains throughout the entire swaged joint by an intimate mechanical union of the parts. Furthermore, the longitudinally disposed knurls may form a seal by preventing circumferential passage of vapor around the plug.

During the turning over or peening of the annular flange 12, the knurls in groove 15 may prevent rotation of the plug relative to tube 5. By peening over the flange 12, said flange presses down the end of the tube onto the plug, forces the end of the tube back against the base of the flange and forms a seal against the end of the tube and on the outside of it. A rounded bead is thus formed which protects the end of the tube and functions in effect as a clamp which prevents the plug or tube from working loose under stresses or strains, or expansion or contraction due to thermal conditions.

While the joint has been proven in tests to be absolutely leak-proof, it may be desirable under certain conditions to provide threads 7 with a filler, although no filler is necessary with the present improvements. Furthermore, the provision of the knurls in groove 15 is not essential to the leak-proof joint which may be formed with the knurls omitted. During use the rotation of valve 16 within the plug 6, especially when screwed tightly to seat 8, cannot turn the plug 6 relative to the tube, since the swaged portion of the tube cooperates with the knurls to prevent such relative movement. However, this safety measure may be accomplished by making threads 7 and 13 as left hand threads. In fact, in employing the joint of the present improvements in fields where there is no valve, such as valve 16, or any other rotating factor with which to contend, the knurls may be dispensed with, since the joint will be tight without them.

It is notable that a joint made by the above described method is unusually strong, tight and heat resistant. In the embodiment chosen for illustration, simplicity of assembling and economic manufacture are of marked importance, and these factors obtain with respect to the present improvements. Primarily, the welded joint is dispensed with and its attendant disadvantages removed. In a mechanical joint of the type herein disclosed, the manufacturer and user are not confronted with the uncertainty of a defective weld which occurs frequently and cannot be detected until after the joint has been in use for some time.

A further advantage of the present improvements resides in the perfect alignment of the parts after the swaging operation has been performed. This feature represents a marked departure from a welded or brazed joint which must be straightened and machined after the joint is formed in order to insure proper alignment of the parts. Likewise in the present peened non-welded mechanical joint the inner portion of the joint is perfectly clean after the joint is formed, whereas in welding the inside portion of the joint as well as the threads on the inside of the plug become scaled from the heat of the weld and this fine scale peels off during use and tends to clog any small orifices beyond the joint. Accordingly, with the present improvements there is no possibility of such scaling off during use.

It is notable that this mechanically formed joint is not only fluid-tight but also will withstand extreme changes of temperature and high pressure without developing leaks. A novel feature also resides in the fact that the joint is made by peening or swaging integral portions of each member against the companion member, thereby facilitating manufacture and assembly of the members by eliminating a third member in the form of a ring or sleeve for swaging into the joint. The use of the metal itself of each tubular member in forming the joint is economical and promotes a more efficient mechanical union of the members.

As heretofore noted, the improved methods may be employed in assemblying water or gas mains in the field where welding or other methods may prove inconvenient and undesirable. Furthermore, the simplicity of the method is emphasized by the fact that efficient joints may be made by hand tools for rolling the parts tightly in place.

Various applications and modifications of the present improvements may occur to those skilled in the art and may be made without departing from the scope and purview of the invention.

We claim:

1. A device of the character described comprising a pair of tubular members having portions disposed in telescoped relation, one of said members having a portion swaged to the other member, said other member having a portion swaged to said first named swaged portion.

2. A vaporizing tube for hydrocarbon burners comprising an elongated tubular member, a hollow bushing having a portion in telescoped relation to said member, and a swaged joint connecting said member and bushing, wherein said member is swaged to said bushing and a portion of said bushing is peened to said member.

3. A device of the character described comprising a metallic tubular member, a hollow metallic plug having an annular flange, a portion of said plug having threaded engagement with said member with said flange adjacent the end thereof, and a swaged joint formed by said flange and the end portion of said member.

4. A device of the character described comprising a tubular member, a hollow plug having an annular groove disposed within said member and an annular flange disposed without said member, said plug and member being mechanically joined by a swaged joint, formed by swaging a portion of said member into said groove and by swaging said flange about the end of said tubular member.

5. A vaporizing tube for hydrocarbon burners comprising a tubular member, a hollow plug having an annular groove disposed within said member and an annular flange engaging the end of said member, said plug and member being mechanically joined by a swaged joint, formed by swaging the end portion of said member into said groove and flange, and by swaging said flange about the said end of said member.

6. A vaporizing tube for hydrocarbon burners comprising a tubular member, a hollow plug having an annular knurled region of different diameter than that of the remainder of the plug, said region being disposed within said tubular member, said plug and member being mechanically joined by a swaged joint, formed by swaging at said knurled region.

7. A vaporizing generator comprising an elongated tube, a hollow plug screw threaded within said tube and having a knurled portion disposed within said tube, and a swaged joint mechanically uniting said tube and plug formed by swaging at said knurled portion.

8. A vaporizing tube for hydrocarbon burners comprising a tubular member, a hollow plug having an annular groove disposed within said member and an annular flange engaging the end of said member, said plug and member being mechanically joined whereby the end portion of said member is compressed into said groove and said flange is turned over about the end of said member.

9. A vaporizing tube for hydro-carbon burners comprising a metallic tubular member having an interiorly threaded portion, a hollow metallic bushing having an exteriorly threaded portion, said bushing being threaded into said member in concentric relation and a swaged joint uniting said member and bushing in leakproof relation.

WALTER C. LINDEMANN.
ADOLPH T. SCHMIDT.